United States Patent Office

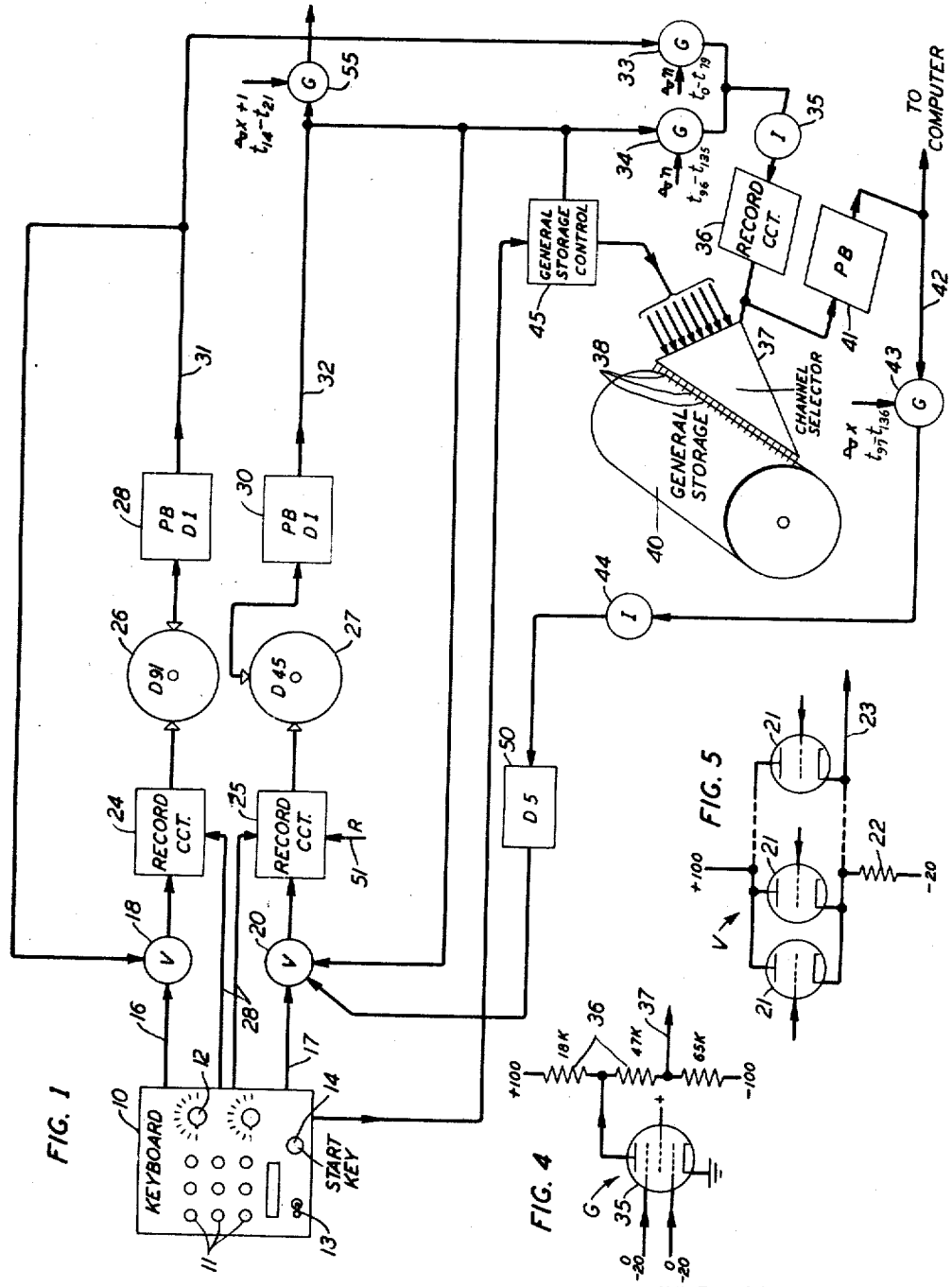

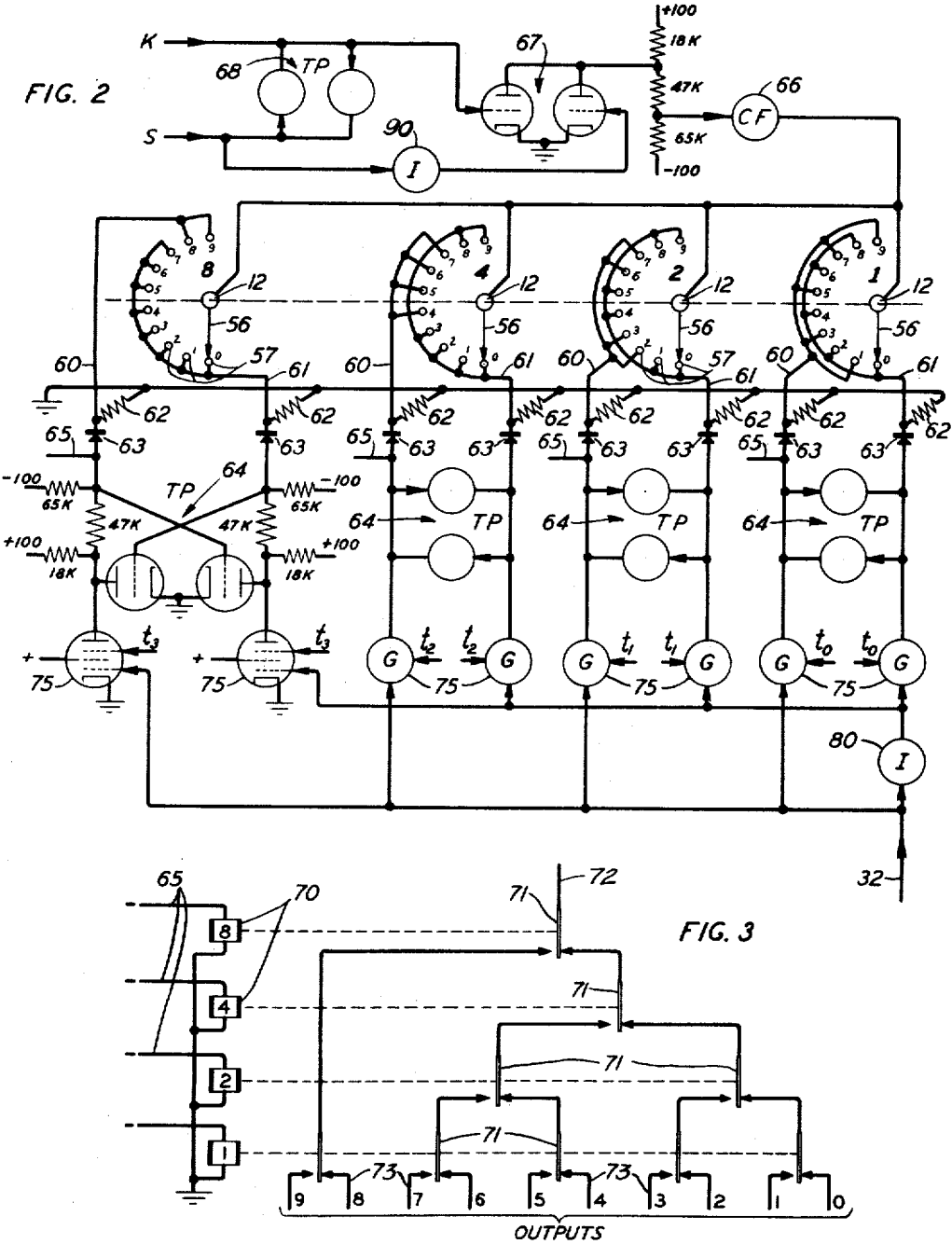

2,855,584
Patented Oct. 7, 1958

2,855,584

OPERATING CONTROLS FOR ELECTRONIC COMPUTERS

Joseph F. McCarroll, Jr., and William H. Burkhart, East Orange, N. J., assignors to Monroe Calculating Machine Company, Orange, N. J., a corporation of Delaware Application November 9, 1951, Serial No. 255,712

6 Claims. (Cl. 340—174)

This invention relates to electronic computers and more particularly to control means therefor.

Electronic computers include, as a required element, an input device whereby information and orders are entered into the computer, the former to be acted upon, and the latter to control the mode of such action. One such input device is a keyboard operable manually to enter each item of information and each order into a selected location in the computer storage medium, said information items and orders being extracted from said storage medium, the first under control of the keyboard, but the remainder automatically, in the proper sequence under control of the orders themselves. The period of transition from keyboard control to automatic "orders control" and the means for accomplishing said transition are the matters with which the invention is concerned.

The principal object of the invention is the provision in a keyboard controlled computer, of means for switching the computer from manual keyboard controlled operation to automatic sequencing under orders control.

According to the invention, a ten key type keyboard is utilized for transmitting information and orders, digit by digit, to intermediate computer storage devices whence each whole information item or order is shifted to a selected location in a general storage device. The means for selecting the storage location for each item may include selector switches on the keyboard, a location selection circuit, a control circuit for the selection circuit, which is itself controlled by said switches when the keyboard is in operation, and by orders transmitted thereto from the intermediate orders storage device during automatic sequencing of the computer, means for shifting orders from the general storage device to the intermediate storage device under control of said switches in the case of the first order to be so shifted, and under control of the preceding order in all subsequent cases, and keyboard switch operated means for disabling the keyboard control of the last said means after it has been actuated once.

Other objects and features of the invention will become apparent from the following description when read in the light of the attached drawings, of which Fig. 1 is a block diagram illustrating a preferred embodiment of the invention.

Fig. 2 is a schematic wiring diagram of a portion of the means shown in block form in Fig. 1.

Fig. 3 is a schematic wiring diagram illustrating the details of a selection circuit shown in block form in Fig. 1.

Fig. 4 is a detailed wiring diagram of a coincidence gate, and

Fig. 5 is a detailed wiring diagram of an "or gate."

Referring to Fig. 1, the computer to which the invention is applied includes a ten key keyboard 10 having the usual digit keys 11 and also a pair of selector switches 12, a shift key or switch 13 which may be provided to obviate the need for separate sets of digit keys 11 for orders and information, and a start key 14. The circuitry associated with digit keys 11 may be of any suitable sort that produces an appropriately timed burst of serial, coded decimal (1, 2, 4, 8) pulses in response to each digit key operation. Arrangements for accomplishing this are described in the co-pending application to W. Burkhart et al., No. 219,622, now Patent No. 2,610,243, and the co-pending application to W. Oliwa, No. 236,840, now Patent No. 2,641,753. This pulse code producing means forms no part of the present invention and need not be shown or described, it being sufficient for an understanding of the invention to realize that each operation of a digit key 11 results in the production of one or a combination of four pulses which occur during successive time periods of computer cycle and represent in coded decimal notation the digit indicated by the operated key. Preferably, the code pulses are produced during the first four of one hundred eighty time periods which make up a computer cycle, said four time periods hereinafter being referred to as time periods $t_0$, $t_1$, $t_2$ and $t_3$.

Code signals from keyboard 10 are transmitted over lines 16 and 17 to intermediate information and orders storage devices respectively in accordance with the setting of switch 13 which may connect the pulse producer with either said line. Lines 16 and 17 are connected, respectively, to "or gates" 18 and 20 which may be of the sort indicated in Fig. 5. As shown, a triode 21 is provided for each input to the gate and have their anodes commonly connected to a source of positive potential, say 100 volts, and their cathodes commonly connected through a resistor 22 to a source of negative potential, say −20 volts. The grids of the triodes are connected to separate pulse sources such as the keyboard code pulser which may conveniently have a normal output potential level of −20 volts that is raised to zero volts on the occurrence of a pulse. An output line 23 is taken from the connected cathodes of the triodes and, when all of the latter are cut off due to low potentials on their grids, assumes a potential of substantially −20 volts. However, the application of a pulse to any of the triodes causes the same to conduct and the poetntial of output line 23 is raised to approximately 0 volt.

In view of the above, it is believed evident that the outputs of gates 18 and 20 (Fig. 1) are high (0 volt) each time a pulse is transmitted thereto to indicate a binary one, and are low between pulse occurrences to indicate binary zero. For example, if the seven key 11 is depressed, pulses are transmitted to the appropriate gate 18 or 20 during time periods $t_0$, $t_1$ and $t_2$ to indicate binary ones in the "ones," "twos" and "fours" places but no pulse is transmitted during time period $t_3$ and binary zero is indicated in "eights" place, all in accordance with the serial, coded decimal system of notation.

Gates 18 and 20 control the mode of operation of normally disabled record circuits 24 and 25 respectively which, when enabled by other means, are effective to magnetize discrete spots on the periphery of a rotating magnetic disc 26 or 27, said spots being given one polarity to indicate binary 1 and the opposite polarity to indicate binary zero. Preferably the record circuits are enabled for operation for a complete cycle each time a key 11 is depressed, which circuit being the one enabled depending on the setting of switch 13. Any desired means to this end may be utilized, the connections therefor merely being indicated by the lines 28 in Fig. 1. For example, each record circuit may include a coincidence gate controlled jointly by digit pulses and by timing pulses over the associated line 28, said timing pulses being produced by a generator synchronized with the discs and adapted to produce a train of 180 pulses (one for each time period in a cycle) on each enabling thereof.

Discs 26 and 27 are identical, and, if desired, may be driven by the same constant speed motor, each rotation thereof measuring a cycle of one hundred eighty time periods. Each disc has on its periphery a magnetic coating adapted to have a discrete spot thereof magnetized during each time period of a cycle.

Also associated with discs 26 and 27 are playback circuits 28 and 30 respectively which may be of any suitable sort and whose output lines 31 and 32 are coupled back to the "or gates" 18 and 20.

The recording and playback heads associated with disc 26 are so located relative to one another that a delay of 92 time periods is obtained between the recording of a spot thereon and the transmission from the playback means to the record means of a signal indicative thereof. Thus a spot recorded during time period $t_0$ is re-recorded during time period $t_{92}$ of the same cycle. The spot is not re-recorded during time period $t_4$ of the next following cycle, however, due to the fact that following time period $t_{179}$ of the recording cycle, the record circuit is disabled. Instead, the spot remains in the same position on the disc until the record circuit is re-enabled for another cycle, during time period $t_4$ of which said spot is re-recorded. This recording arrangement is fully described and claimed in the co-pending application #255,643 of H. Fleming, now Patent #2,759,171, filed on even date herewith. If desired any other suitable recording arrangement may be substituted for that described; for example, the one disclosed in the copending application to W. Burkhart #228,148.

It will readily be seen that this four time period precession of recorded information between successive operations of the digit keys 11 permits of a standard, keyboard controlled recording time for each digit, namely time periods $t_0$, $t_1$, $t_2$ and $t_3$ of any cycle, each digital recording being precessed to make room for the next.

The record and playback heads for orders disc 27 are so located relative to each other that a delay of forty-six time periods is obtained between the recording and the playing back of a spot to the record means. Obviously, this effects the same result as described above in connection with disc 26. The reason for utilizing a forty-six time period delay in place of the earlier described ninety-two time period delay will become apparent hereinafter.

The output lines 31 and 32 of the two playback circuits are also connected respectively to a pair of coincidence gates 33 and 34 which may be of the sort shown in Fig. 4. As illustrated, a pentode 35 of appropriate type has its cathode grounded and its anode connected to the juncture of the two positive most sections of a three-section voltage divider 36 which is applied across sources of $+$ and $-100$ volts potential and which has an output line 37 taken from the center tap thereof. The screen grid is tied to a source of positive potential but the control and suppressor grids are connected to signal sources which apply potentials of 0 or $-20$ volts thereto. When both grids are at the higher potential the tube conducts and output line 37 assumes a potential of $-20$ volts. However, if either grid has the lower potential impressed thereon, the tube is cut off and output line 37 assumes a potential of zero volts.

For convenience of description it will be assumed that the playback of a spot indicative of binary one causes playback output line 31 or 32 to impress a potential of zero volts on the associated gate 33 or 34; and that low potentials of $-20$ volts are applied to said gates to indicate binary zeros.

Gates 33 and 34 may be provided with a common voltage divider of the sort indicated in Fig. 4, with the output line thereof applied to an inverter 35 which may be a triode having its anode connected to a voltage divider of the type described. Obviously, the common output of gates 33 and 34 is high only when both are cut off and is low whenever one or both conduct. Therefore, the output of inverter is low ($-20$ volts) except when an appropriately timed signal indicative of binary 1 is transmitted to one of the gates, at which time the output of said inverter is high (0 volt). The secondary inputs of gates 33 and 34 are timing controls which permit signals from the discs 26 and 27 to be effective only during specific sets of time periods of a particular cycle. For example, it is assumed that each information number entered through keyboard 10 contains twenty digits and that following the entry of the last digit, the number is played back from disc 26 during time periods $t_0$–$t_{79}$ of a particular cycle $n$ which may be arrived at by counting the depressions of the digit keys 11 in the manner set forth in the co-pending application #255,711 of W. Burkhart, entitled Keyboard Checking Circuit, now Patent #2,700,755, filed on even date herewith. A time period counter and a coincidence gate may also be furnished to provide the auxiliary input of gate 33 with a high potential (0 volt) during time periods $t_0$–$t_{79}$ of cycle $n$ in the manner set forth in said Burkhart application.

Gate 34 which is associated with the orders disc 27 may be controlled as to timing in the same manner as just above described, it being desired, however, to open this gate during a different set of time periods of a cycle $n$, say time periods $t_{96}$–$t_{135}$. The purpose of this is to permit of an information number and an order number being stored in different time positions of each channel of a general storage device presently to be described.

The output of inverter 35 is applied to a record circuit 36 which is connectable by a selector circuit 37 with any one of a series of combined recording and playback heads 38 that cooperate with a magnetic drum 40 of the type disclosed in the patent to Cohen et al. #2,540,654. Briefly, the drum is identical, magnetically, with the discs 26 and 27, but, physically, it is substantially wider axially to accommodate a series of parallel peripheral recording channels, one for each of the heads 38. For convenience of operation, drum 40 and discs 26 and 27 are driven in synchronism. Record circuit 24 may be of any suitable sort adapted to magnetize a spot in a selected channel of drum 40 with one polarity on application of a low potential ($-20$ volts) thereto and to magnetize a spot with the opposite polarity on application of a high potential thereto, the former indicating binary zero and the latter binary one. Thus zeros are recorded continuously except when one of the gates 33 or 34 is made conducting to indicate a binary one, at which time the latter is recorded.

The channel selection circuit 37 also selectively connects the heads 38 with a playback circuit 41 which may be of any sort adapted to distinguish between binary one and binary zero recordings and to deliver to an output line 42 thereof high potentials (0 volt) for the former and low potentials ($-20$ volts) for the latter. Line 42, besides leading to utilization devices of the computer, is also applied to a coincidence gate 43 whose auxiliary control is timed to open the gate during, say, time periods 97–136 of cycle $x$ of each computer operation. Such timing signals are readily obtainable in the same manner as set forth above, the cycle counter, however, being controlled solely by a master recording in an otherwise unused portion of drum 40 rather than by keyboard key depressions, and the time period counter operating continuously rather than for a single cycle in response to each key depression. The output of gate 43 is applied to an inverter 44 whose output is, in turn, applied to orders "or gate" 20. If desired, inverter 44 may be eliminated by reversing the binary meaning of the output potentials of playback circuit 41.

As thus far described, the invention contemplates serially recording the digits of orders and information numbers in intermediate storage devices, shifting said numbers to selected channels of a general storage device, in each of which channels, order and information numbers are stored in different time locations, playing back the numbers from said channels selectively, and shifting played back order numbers back to the intermediate orders storage device.

The channel selection circuit 37 is set up to connect the head 38 for a particular channel with the record or playback circuits 36 or 41, under control of a general storage control circuit 45 which is in turn controlled by the selector switches 12 of keyboard 10, and by the output of playback circuit 30, the former being effective during keyboard operations and also for the first operation of the computer, and the latter being effective during all subsequent operations of the computer.

At this point, it is deemed desirable to describe briefly the makeup of an order as utilized in the present instance. Each order contains ten digits of which the first two, in time of playback from drum 40, are utilized for determining the operation to be performed by the computer, the next four pairs are utilized each to control the operation of unit 45 in setting up selector circuit 37. For purposes of description it may be assumed that the last pair of digits played back from drum 40 is effective to select a first factor from the drum, the next pair to select a second factor, the third pair to select the location in which the result of an operation on said factors is to be stored, and the fourth pair to select the next succeeding order from drum 40. In each case, the two digits are capable of selecting any channel 00, 01 . . . 99 of drum 40 for playback of the data therein.

In order to time data transmitted from drum 40 to disc 27, appropriately a five time period delay circuit 50 of any suitable sort is connected between inverter 44 and orders "or gate" 20. Further, in order to enable orders record circuit 25 during the appropriate cycles of a computer operation, say the first ten, the same may be provided with an auxiliary input 51 from any source such as a cycle counter or the like.

It will be seen, therefore, that an order played back from drum 40 during time periods 96 to 135 of a cycle X and delayed one time period in playback unit 41, due to the action of the latter, is not delivered to record circuit 25 until time periods 102 to 141 due to the action of delay circuit 50. And, during time periods $t_0$, $t_1$, $t_2$ and $t_3$ of cycles $X+1$, $X+3$, $X+5$ and $X+7$, a pair of orders digits are transmitted by playback circuit 30 to general storage control unit 45, the first pair being that transmitted from the drum last, during time periods $t_{128}$–$t_{135}$. The pair of orders digits first transmitted from drum 40, which digits, it will be remembered, are utilized for controlling the mode of operation of the computer, are not used to control the general storage control circuit 45 but rather are transmitted to an operation control unit of suitable design. To this end, a branch of output line 32 from orders playback circuit 30 is applied to a coincidence gate 55 whose secondary input is timed to open the gate at the appropriate time, namely, time periods $t_{14}$–$t_{21}$ of cycle $X+1$. The output of gate 55 is, of course, applied to the operation control unit. Therefore, immediately following the actuation of general storage control unit 45 to effect extraction of a first factor from drum 40, the mode of operation of the computer is determined.

One of the selector switches 12 of keyboard 10 and the portion of the general storage control unit 45 associated therewith is shown in Fig. 2. The other switch and the remainder of the unit are not shown since they are merely duplications of the illustrated arrangements.

Referring to Fig. 2, switch 12 preferably comprises four ganged rotors 56 which cooperate each with a bank of ten contacts 57. As indicated, the four rotors are representative of the digits 1, 2, 4 and 8 in the coded decimal system of notation, and the ten contacts associated with each rotor are representative of the decimal digits 0–9. On inspection, it will be seen that in each bank of contacts 57, those representative of decimal digits which in coded decimal notation include the coded decimal digit represented by the associated rotor 56, are connected to a line 60; and the other contacts of each bank are connected to a line 61. Therefore, if switch 12 is set to indicate seven, for example, the "fours," "twos," and "ones" rotors 56 are connected to the associated lines 60, while the "eights" rotor is connected to the associated line 61. All of the lines 60 and 61 are connected through resistors 62 to ground and each line is also connected to the cathode of a crystal rectifier 63. The rectifiers associated with each pair of lines 60 and 61 have their anodes connected to the grids of the triode of a stable trigger pair 64 in such manner as to pull the trigger to its opposite states on application of low potentials thereto. For convenience, each line 60 will be considered as setting its trigger pair, and each line 61 as resetting the same. The triggers 64 may be of any suitable type but preferably are as indicated at the left of Fig. 2. As shown, a pair of three-section voltage dividers of the type discussed above each have the anode of one tube and the grid of the other applied thereto. Thus, conduction of one tube maintains the other cut off and vice versa. Application of a potential of say —20 volts to the grid of a conducting tube over a line 60 or 61 cuts off the tube and effects conduction of the other. An output line 65 is taken from the grid of one tube of each pair, and indicates by its potential (0 or —20 volts) the state of the trigger.

The trigger output lines 65 are applied to the channel selector circuit 37 which may comprise a relay pyramid. A simple pyramid of the type involved is shown in Fig. 3 and includes four relays 70 each connected with one of the lines 65 from the triggers 64 of Fig. 2. The code values (1, 2, 4, 8) of the relays are indicated in the drawing, and each is provided with appropriate transfer contacts 71 for switching signals from an input line 72, which may lead from record circuit 36 (Fig. 1), to any one of ten output lines 73 having the decimal values 0–9 in accordance with the states of energization of the relays. Lines 73, of course, are connected to the recording-playback heads 38 associated with drum 40. Translating or switching circuits of this sort are so well known that it is not deemed necessary to amplify the foregoing brief description thereof other than to state that when a trigger pair 64 is in the "set" state it maintains the associated relay 70 energized, and that when it is in the "reset" state the associated relay is not energized.

The rotors 56 of switch 12 are connected to the output of a cathode follower 66 of ordinary design, whose input is derived from a gate 67 and which serves as a common puller tube for the several trigger pairs 64. Gate 67 may comprise a pair of triodes having their anodes connected to a common three-section voltage divider of the type discussed above. The inputs of gate 67 are derived from a trigger pair 68 and an inverter 90, the latter being controlled by the start key 14, and the former being set by operation of any digit key and reset by said start key. Preferably, the depression of a digit key applies a potential of —20 volts to one trigger input while a depression of the start key applies the same potential to the other trigger input and also to inverter 90. The operation is as follows.

The switches 12 are set in the desired positions and a number is entered into the computer through the medium of the digit keys 11 (Fig. 1). Operation of the first digit key 11 sets trigger pair 68 and a high potential (0 volt) is applied to the associated one of the inputs of gate 67. This produces a low potential at the input of cathode follower 66, and, due to the familiar action of the latter, a low potential on the rotors 56 which are connected to the output thereof (Fig. 2). The low potentials applied to said rotors effect current flow through those rectifiers 63 which are connected thereto by the settings of the switches 12, and the associated trigger pairs 64 are set or reset as the case may be. Obviously, the potentials of the output lines 65 of said triggers are indicative of the settings of switches 12, and energize the channel selector relays 70 accordingly.

When all of the required data is entered into the computer, the switches 12 are set to effect selection of the first order from the drum channel in which it is stored, and the start key 14 is depressed (Fig. 1). The setting of the switches 12 immediately changes the set-up of the trigger pairs 64 and the appropriate channel selector relays 70 are energized (Figs. 2 and 3). Operation of the start key 14 resets the keyboard trigger pair 68 and the output thereof to gate 67 drops to a low potential of, say, −20 volts. At the same time, however, the trigger resetting low potential from key 14 cuts off inverter 90 and the latter applies a high potential to the other tube of gate 67. This potential, however, is removed as soon as the start key is restored, and further setting of switches 12 is ineffective to control the trigger pairs 64 as cathode follower 66 applies a high potential (0 volt) to the rotors of said switches. Said trigger pairs 64 are then under control of orders extracted from drum 40 as presently will be described. First, however, it is to be mentioned that if for some reason or other the computer is stopped and it is desired to restart it to begin an operation in accordance with an order located in a particular channel of drum 40, all that is required is to set the switches 12 appropriately and to depress the start key 14 which, as just above described, momentarily enables switches 12 to control the trigger pairs 64.

It will be remembered that those portions of order numbers relating to drum loctaions are played back from disc 27 and delivered over line 32 to the general storage control circuit 45 during time periods $t_0-t_7$ of cycles $X+1$, $X+3$, $X+5$ and $X+7$. Referring to Fig. 2, the anodes of the trigger pairs 64 are connected, each to the anode of a coincidence gate puller 75 which is made conducting to pull the trigger to one of its two states. As shown at the left of Fig. 2, gates 75 utilize the voltage dividers of the trigger pairs rather than being provided with their own. Obviously, if the left-hand gate associated with each trigger is made conductive, the trigger is "set," with the results described above, whereas, if the right-hand gate of a pair is made conductive, the associated trigger is reset. Accordingly, output line 32 of playback circuit 30 is connected to an input of each left-hand gate 75, and an input of each right-hand gate is connected to the output of an inverter 80 to which line 32 is also connected. The other inputs of the gates are timing controls which may be derived from any suitable sources such as cycle and time period counters. Gates 75 for the "ones" trigger pair have high potentials applied to their secondary inputs during time period $t_0$ of the appropriate cycles ($X+1$, $X+3$, $X+5$ and $X+7$), the "twos" gates 75 are conditioned for operation during time period $t_1$ of said cycle, the "fours" gates 75 during time period $t_2$, and the "eights" gates during time period $t_3$.

It will readily be seen, therefore, that as the first digit of an order pair is transmitted to the gates 75 during time periods $t_0$, $t_1$, $t_2$ and $t_3$ of a cycle $X+1$, $X+3$, $X+5$ or $X+7$, the appropriate ones thereof are made conducting in the proper sequence, the pulse or pulses representative of the digit each being effective only on the coincident appearance of a timing impulse at the appropriate gate 75. Obviously, appropriate operations of the gates 75 sets and resets the triggers 64 in the required manner, and channel selection relays 70 are operated accordingly to effect playback of the information recorded in a selected channel of drum 40.

It is to be mentioned that, if desired, the gates 75 and the associated circuitry may be replaced by a shift register of suitable design, for example the one disclosed in the copending application to W. Burkhart #220,846.

We claim:

1. In an electronic computer or the like, the combination of a signal transmitting keyboard, a general storage device having a plurality of channels, an intermediate storage device for receiving signals from said keyboard and said general storage device and for transmitting said signals to said general storage device, means for selecting the channels of said general storage device from which and to which signals are sent, a plurality of trigger pairs controlling said selecting means in accordance with their set condition, and means for setting said trigger pairs responsive to signals from said keyboard and from said intermediate storage device.

2. The combination according to claim 1 wherein said setting means comprises means for transmitting signals from said keyboard to set said trigger pairs selectively and a plurality of coincidence gates receiving signals from said intermediate storage device to set said trigger pairs.

3. The combination according to claim 2 wherein said transmitting means comprises a plurality of multiposition switches having contacts selectively connected to said trigger pairs, and means for applying a signal from said keyboard through said multiposition switches to set said trigger pairs in accordance with the position of said multiposition switches.

4. The combination according to claim 1 wherein said general storage device comprises a multichannel magnetic drum with recording and playback circuits for each channel and said intermediate storage device comprises a plurality of magnetic recording channels having precessing control means.

5. The combination according to claim 2 wherein said general storage device comprises a multichannel magnetic drum with recording and playback circuits for each channel and said intermediate storage device comprises a plurality of magnetic recording channels having precessing control means.

6. The combination according to claim 3 wherein said general storage device comprises a multichannel magnetic drum with recording and playback circuits for each channel and said intermediate storage device comprises a plurality of magnetic recording channels having precessing control means.

References Cited in the file of this patent

UNITED STATES PATENTS

| | | |
|---|---|---|
| 2,502,360 | Williams | Mar. 28, 1950 |
| 2,527,567 | Munck | Oct. 31, 1950 |
| 2,528,394 | Sharpless | Oct. 31, 1950 |
| 2,540,654 | Cohen | Feb. 6, 1951 |
| 2,587,532 | Schmidt | Feb. 26, 1952 |
| 2,604,262 | Phelps | July 22, 1952 |
| 2,614,169 | Cohen | Oct. 14, 1952 |
| 2,617,704 | Mallina | Nov. 11, 1952 |

OTHER REFERENCES

Proc. of the IRE: "A Digital Computer for Scientific Applications," by West et al.; (pages 1452 to 1459), December 1948.

Mathematical Tables and Aids to Computing; "Magnetic Drum Storage for Digital Information Processing Systems," January 1950, pages 31 to 39.

"A Functional Description of the EDVAC," by the Moore School of Engineering, November 1, 1949; volume 1 pages 2–17, 3–7 to 11 and 3–27. Volume II, drawing 104–10LD–6.

"Investigation for Design of Digital Calculating Machinery," Progress Report 2; Distributed Nov. 10, 1948; Harvard University, pp. II–5–II–9.

Nature, volume 164, Oct. 22, 1949, "The University of Manchester Universal High-Speed Digital Computing Machine," by Kilburn; pp. 684 to 687.

Journal of Scientific Instruments and of Physics in Industry, "The EDSAC—an Electronic Calculating Machine," by Wilies et al.; pages 385 to 391; December 1949.